United States Patent
Watanabe et al.

(10) Patent No.: US 11,122,797 B2
(45) Date of Patent: Sep. 21, 2021

(54) PEST REPELLENT MATERIAL

(71) Applicant: JGC CATALYSTS AND CHEMICALS LTD., Kanagawa (JP)

(72) Inventors: Satoshi Watanabe, Fukuoka (JP); Naoyuki Enomoto, Fukuoka (JP)

(73) Assignee: JGC CATALYSTS AND CHEMICALS LTD., Kanagawa (JP)

(*) Notice: Subject to any disclaimer, the term of this patent is extended or adjusted under 35 U.S.C. 154(b) by 38 days.

(21) Appl. No.: 16/487,216

(22) PCT Filed: Feb. 20, 2018

(86) PCT No.: PCT/JP2018/006045
§ 371 (c)(1),
(2) Date: Aug. 20, 2019

(87) PCT Pub. No.: WO2018/155445
PCT Pub. Date: Aug. 30, 2018

(65) Prior Publication Data
US 2021/0137103 A1    May 13, 2021

(30) Foreign Application Priority Data
Feb. 22, 2017 (JP) .............................. JP2017-031595

(51) Int. Cl.
*A01N 25/12* (2006.01)
*A01N 37/18* (2006.01)

(52) U.S. Cl.
CPC ............. *A01N 25/12* (2013.01); *A01N 37/18* (2013.01)

(58) Field of Classification Search
CPC .................................................. A01N 25/12
See application file for complete search history.

(56) References Cited

U.S. PATENT DOCUMENTS

2003/0049297 A1    3/2003    Tomioka et al.

FOREIGN PATENT DOCUMENTS

| CN | 102210302 A | 10/2011 |
| JP | 6-32701 A | 2/1994 |
| JP | 2000-63201 | 2/2000 |
| JP | 2014-223043 A | 12/2014 |
| WO | 02/22753 A1 | 3/2002 |

OTHER PUBLICATIONS

International Search Report issued in corresponding International Patent Application No. PCT/JP2018/006045 dated Apr. 17, 2018.

*Primary Examiner* — Benjamin J Packard
(74) *Attorney, Agent, or Firm* — Troutman Pepper Hamilton Sanders LLP

(57) ABSTRACT

Provided is a repellent material capable of maintaining a stable repelling effect for a long period of time. A pest repellent material of the present invention includes porous particles including primary particles forming pores and aggregating, and an insect repellent component present in the pores. The primary particles contain silica as a component, and in an infrared absorption spectrum of the pest repellent material, a ratio ($I_1/I_2$) of the maximum absorbance ($I_1$) at 3730 to 3750 cm$^{-1}$ to the maximum absorbance ($I_2$) at 1160 to 1260 cm$^{-1}$ is 0.005 or less. A contact angle of the porous particles with water is greater than 90°, and the contact angle of the porous particles with the insect repellent component is 1° to 90°. It is preferred that 2 to 5 ml of the insect repellent component is contained based on 1 gram of the porous particles.

4 Claims, No Drawings

PEST REPELLENT MATERIAL

CROSS REFERENCE TO RELATED APPLICATIONS

This is a U.S. National Phase application under 35 U.S.C. § 371 of International Patent Application No. PCT/JP2018/006045, filed Feb. 20, 2018, which claims priority of Japanese Patent Application No. 2017-031595, filed Feb. 22, 2017. The entire contents of which are hereby incorporated by reference.

TECHNICAL FIELD

The present invention relates to a repellent material using porous particles containing an insect repellent component. Specifically, the present invention relates to the repellent material which suppresses transdermal absorption and stabilizes transpiration.

BACKGROUND

In order to protect a human body from pests such as mosquitoes, flies, fleas, house dust mites, stable flies, bed bugs and mites, insect repellent preparations containing insect repellent components are used. It is necessary to reduce skin irritation and transdermal absorption also for the insect repellent components (such as DEET and picaridin) which are allowed to be applied to skin. For example, it has been reported that about 50% of DEET applied to the skin is transdermally absorbed within 6 hours. Therefore, the repellent material containing porous particles having insect repellent components filling the pores thereof has been known (for example, see JP-A-2000-063201). Therefore, the transdermal absorption can be reduced. Furthermore, porous silica spherical particles carrying the insect repellent component and synthetic resin fine particles not in close contact with the spherical particles are mixed. With this configuration, by prolonging a staying period of the particles directly spread on a surface of the skin, insect repellent effect is sustained.

SUMMARY

However, the repellent material disclosed in JP-A-2000-063201 has a problem that moisture in an atmosphere is easily adsorbed to porous silica particles. Adsorption of moisture prevents the transpiration of the insect repellent component. As a result, sufficient insect repellent effect cannot be obtained. Specifically, in the case of porous silica particles containing a water-insoluble insect repellent component such as DEET, since a hydrated phase is formed on its surface by moisture absorption, the insect repellent component cannot be effectively transpired. Therefore, the insect repellent effect cannot be obtained stably or continuously.

An object of the present invention is to provide a pest repellent material having a stable repellent effect. The pest repellent material of the present invention includes the porous particles having pores, and the insect repellent component present in the pores. The porous particle is a particle formed by primary particles including contains silica as a component and aggregating. In an infrared absorption spectrum of the pest repellent material, a ratio $(I_1/I_2)$ of the maximum absorbance $(I_1)$ at 3730 to 3750 cm$^{-1}$ to the maximum absorbance $(I_2)$ at 1160 to 1260 cm$^{-1}$ is 0.005 or less.

Furthermore, a pore volume (PV) of the porous particles is 2.0 to 5.0 ml/g, and an average pore diameter (PD) of the porous particles is 0.01 to 0.5 μm. An opening ratio of the pores on a surface of the porous particles is 20 to 75%. A ratio (PD/VP) of the average pore diameter PD (μm) of the porous particles to a vapor pressure VP (Pa) at 20° C. of the insect repellent component is 10 or less.

The repellent material of the present invention is less hydrophilic on the surface of the porous particles. Therefore, the moisture absorption is less likely to prevent the transpiration of the insect repellent component. Therefore, the stable repellent effect can be obtained.

DETAILED DESCRIPTION

Porous particles of a pest repellent material of the present invention contain an insect repellent component. The porous particles are formed by aggregated primary particles. The particles have pores formed of voids between the primary particles. The insect repellent component is present in the pores. When an infrared absorption spectrum of the porous particles is measured, the ratio $(I_1/I_2)$ of the maximum absorbance $(I_1)$ at 3730 to 3750 cm$^{-1}$ to the maximum absorbance $(I_2)$ at 1160 to 1260 cm$^{-1}$ is 0.005 or less. This absorbance ratio $(I_1/I_2)$ depends on an amount of silanol groups on a surface of the particles. Therefore, both the porous particles and the porous particles (that is, repellent materials) in which the pores are filled with the insect repellent component have almost the same absorbance ratio. When the silanol groups (Si—OH) on the surface of the particles decreases, an infrared absorbance at 3730 to 3750 cm$^{-1}$ decreases. On the other hand, the infrared absorbance at 1160 to 1260 cm$^{-1}$ attributed to Si—O—Si increases. The silanol groups are bonded to water. Therefore, the smaller the number of silanol groups, the lower the hydrophilicity. That is, the smaller the absorbance ratio $(I_1/I_2)$, the lower the hydrophilicity of the surface of the particles. In order to reduce the absorbance ratio, the surface may be made hydrophobic by surface treatment with a silane compound or the like, or by destroying the silanol groups with high temperature firing or the like. This hydrophobization treatment may be performed before or after the insect repellent component is contained.

When the silane compound is used for the surface treatment, it is preferable to use a low molecular weight silane compound having a molecular weight of 500 or less. Even in the case of a polymeric silane compound, hydrophobicity can be obtained by bonding to the silanol group. However, the polymeric silane compound has a large molecule, which prevents other silane compound molecules from bonding to neighboring silanol groups. As a result, unbonded silanol groups may be left (steric hindrance). Thus, if the silanol group remains, a local hydrophilic phase may be formed in a place where the silanol group remains. Therefore, it is preferable to use the low molecular weight silane compound, to reduce the number of the unbonded silanol groups. Furthermore, small-sized low molecular weight compounds reliably bond also to the silanol groups in the pores. Thus, the hydrophobicity can be imparted also to the surface in the pores.

Such a porous particle is hydrophobic. Its contact angle with water exceeds 90°. However, the contact angle with the insect repellent component is in a range of 1° to 90°. Therefore, the porous particle does not absorb moisture. Thus, the transpiration of the insect repellent component is not prevented. Therefore, stable insect repellent effect is obtained.

Preferred pore volume of the porous particles is 2 to 5 ml/g. The porous particles having a large pore volume can contain many insect repellent components. Therefore, the insect repellent effect lasts. Furthermore, since the insect repellent component is held in voids (the pores) in the porous particles, the insect repellent component does not directly touch skin. Thus, transdermal absorption is suppressed. Therefore, the insect repellent effect can be obtained for a long time.

In order to obtain a high insect repellent effect, it is preferred that 2 to 5 ml of the insect repellent component is contained based on 1 gram of the porous particles. There is generally a limit to an amount of the porous particles which can be contained in the repellent material. Therefore, the more the insect repellent component contained per unit mass of the porous particles of the repellent material, the greater the insect repellent effect of the repellent material.

A transpiration rate of the insect repellent component can be controlled by adjusting an opening ratio of the pores of the porous particles or a size of average pore diameter of the porous particles depending on a vapor pressure of the insect repellent component. A ratio (PD/VP) of the average pore diameter [PD (μm)] of the porous particles to the vapor pressure [VP (Pa)] of the insect repellent component at 20° C. is preferably 10 or less. If the ratio is in this range, rapid transpiration can be prevented. This provides a sustained insect repellent effect. Furthermore, the transpiration of the insect repellent component is not prevented. The opening ratio of the pores on the surface of the particles is preferably 20 to 75%. If the opening ratio is less than 20%, the transpiration of the insect repellent component is prevented. As a result, the stable insect repellent effect cannot be obtained. If the opening ratio exceeds 75%, strength of the porous particles is weak. As a result, the particles break up in a step of adding the insect repellent component or in a step of blending into preparations.

An average size of the porous particles is suitably 2 to 20 μm. If the average size is in this range, it is possible to obtain a smooth feeling when the repellent material is applied to the skin. A compressive strength of the porous particles is preferably 0.1 to 100 KPa. When the repellent material containing porous particles is manually stretched on the skin, the porous particles break up into fine particles. The fine particles then adhere to the skin. Therefore, even if there is moisture such as sweat or rain, it is difficult for the particles to drop off from the skin. Therefore, pest repelling effect can be sustained. The average size of the fine particles is preferably 0.05 to 1.0 μm.

Here, the porous particles may contain 10 to 50% by mass of alumina, zirconia, titania or the like in addition to silica as a main component. Since the porous particles are blended in the repellent material, the particles made of amorphous silica are preferable.

Examples of the insect repellent components include icaridin, IR3535 (cetyl butylaminopropanoate) and the like in addition to DEET (N, N-diethyl-m-toluamide) whose safety has been confirmed for a human body. Furthermore, insect repellents extracted from naturally-derived plants or the like include essential oils of lemon *eucalyptus* and their active compounds PMD (p-menthane-3,8-diol), *achillea* oil, oregano oil, catnip oil, citronella oil, cinnamon skin oil, cinnamon leaf oil, camphor, cedar oil, geranium oil, celery extract, thyme oil, tea tree oil, clove oil, neem oil, garlic oil, hazelnut oil, basil oil, mint oil, castor oil, fennel oil, peppermint oil, marigold oil, *eucalyptus* oil, lavender oil, lemongrass oil, rosemary oil and mixtures thereof. Hereinafter, Examples using DEET as the insect repellent component will be specifically described.

Example 1

First, the porous particles are prepared. The porous particles contain pores. The pores are formed of the voids between the aggregated primary particles (silica-based particles). This aggregation separates (dissolves) when a predetermined compressive force is applied to the porous particles. As such collapsible porous particles, SMBSP-1 (average particle size 12 μm, pore volume 2.9 ml/g, pore diameter 100 nm, oil absorption amount 370 ml/g) produced by JGC Catalysts and Chemicals Ltd. was used in this Example. To 1.0 kg of the porous particles, was added 0.1 kg of hexamethyldisilazane (SZ-31 produced by Shin-Etsu Chemical Co., Ltd., molecular weight: 161.4) and 3.7 kg of methanol (special grade reagent). This mixed solution was stirred at an output of 5 Hz for 10 minutes using a mixer (FM10C/I manufactured by NIPPON COKE & ENGINEERING CO., LTD.). Then, it was heated at 120° C. for 16 hours. Thus, the porous particles are surface-treated with the silane compound. Then, the silanol groups on the surface of the particles are reduced. Hydrophobized porous particles (i) can be prepared by drying the obtained mixed liquid in a rotary evaporator. Next, 2.8 liters of DEET (produced by Tokyo Chemical Industry Co., Ltd.) is added to the porous particles (i). Furthermore, the mixture is mixed for 5 hours at room temperature using the rotary evaporator. As a result, DEET is contained in the porous particles (i). Thus, the pest repellent material (i) is obtained. The following physical properties were measured using the porous particles or the pest repellent material as Sample 1. The results are shown in Tables 1 and 2.

(1) Absorbance Ratio

The infrared absorption spectrum of the porous particles (i) was measured using FT-IR6300 (manufactured by JASCO Corporation). Thus, a graph showing a relationship between wave number ($cm^{-1}$) and absorbance calculated by KubelkaMunk equation was created. From the obtained graph, the maximum absorbance ($I_1$) at 3730 to 3750 $cm^{-1}$ and the maximum absorbance ($I_2$) at 1160 to 1260 $cm^{-1}$ were read, and the absorbance ratio ($I_1/I_2$) was calculated. The results are shown in Table 1.

(2) Measurement Method of Contact Angle 1 g of the porous particles (i) was dried at 200° C. Thereafter, the porous particles (i) placed in a cell having a diameter of 1 cm and a height of 5 cm were pressed with a load of 50 kgf to obtain a molded product. One drop of water was dropped on a surface of the obtained molded product, and the contact angle with water was measured. Similarly, one drop of DEET was dropped on the surface of the obtained molded product, and the contact angle with the insect repellent component was measured. The results of the measurements are shown in Table 1.

(3) Pore Volume, Average Pore Diameter 10 g of powders of porous particles (i) was placed in a crucible and dried at 300° C. for 1 hour. Thereafter, the crucible was placed in a desiccator and cooled to room temperature. Then, using an automatic porosimeter (PoreMasterPM33GT manufactured by Counterchrome Instruments), the pore volume and the average pore diameter were measured by a mercury intrusion method. Mercury was injected at 1.5 kPa to 231 MPa, and pore diameter distribution was determined from a relationship between pressure and pore diameter. According to this method, mercury is injected into pores of about 7 nm to about 1000 μm.

Therefore, both small diameter pores present inside the porous particles and large diameter voids between the porous particles (measured roughly ⅕ to ½ the average size of the porous particles) are measured. The pore volume and the average pore diameter were calculated based on measurement results of the small diameter pores excluding the large diameter voids.

(4) Pore Opening Ratio

SEM (scanning electron microscope) photographs (magnification: 30000 times) of a group of the porous particles (i) was taken. Images of 100 to 200 particles randomly selected from the photographs are analyzed and determined using SEM image analysis software (Scandium manufactured by Olympus Corporation). In this case, an imaging magnification may be changed according to particle sizes so that the surface of the particles can be imaged on the entire photographed image. Specifically, as the scanning electron microscope, JSM-6010LA manufactured by JEOL Ltd. is used to obtain a secondary electron image (an SEM photograph). 100 to 200 particles are randomly selected from in the SEM photograph. Image data of the SEM photograph (secondary electron image, 100 times, jpg image) is read by the image analysis software Scandium. A specific region is selected from the image as an analysis region (a frame). The analysis region (frame) is binarized. Specifically, 153 gradation is selected as a lower limit value of each of RGB values. Furthermore, 255 gradation is selected as an upper limit value. Binarization with these two threshold values is performed. A pore in an analysis region area in which binarization has been performed is detected. The analysis region area and a pore area are determined for the detected pores. This procedure is repeated until 100 to 200 porous particles are detected and analyzed. The opening ratio is defined as the opening ratio=(pore area)/(analysis region area).

(5) Compressive Strength

Among the porous particles (i), one particle in a range of average size±0.5 μm is used. Then, a load is applied to this sample at a constant speed using a micro compressive strength tester (MCTM-200 manufactured by Shimadzu Corporation). As a result, a load value when the particle is broken is taken as the compressive strength (kPa). Furthermore, this operation is repeated four times. The compressive strength is measured for five samples. Their average value is taken as the compressive strength of the particles.

(6) Average Particle Size

Particle size distribution of the porous particles (i) was measured using a laser diffraction method. The average particle size represented by a median size was calculated from the particle size distribution. A laser diffraction/scattering particle size distribution measuring apparatus LA-950v2 (with a dry unit, manufactured by Horiba, Ltd.) was used for measurement of the particle size distribution by the laser diffraction method.

(7) Average Particle Size after Collapse

An artificial skin (produced by Beaulux Co., Ltd., Bioskin plate, product number P001-001 #20, 195×30×5T mm) made of urethane elastomer is set on an electronic balance (HF4000 manufactured by A&D Company, Limited). 0.2 g of powders of the porous particles (i) is dropped on a center of the artificial skin. Then, the powders are rubbed for 30 seconds in a circular arc with a load of 250 to 300 g using four fingers. Assuming that a contact area of the four fingers is 4 cm$^2$, the powders are rubbed at a pressure of 1.0 to 1.4 KPa. The powders in the center of the artificial skin are collected after rubbing. Then, the average particle size is measured in the same manner as the above-described method for measuring the average particle size. Thus, the average particle size after collapse was calculated.

(8) Contained Amount of Insect Repellent Component

A ratio of an amount (ml) of the added insect repellent component to a powder weight (g) of silica raw material of the porous particles (i) used in Examples is defined as a contained ratio (ml/g) of the insect repellent component.

(9) Reduction Ratio of Insect Repellent Component 1.0 g of powders (V1) of the pest repellent material (i) is weighed in a glass petri dish (146ϕ×28). Then, a total weight (V2) of the powders and the glass petri dish are recorded. This was exposed in a constant temperature and humidity chamber (IG420 manufactured by Yamato Scientific Co., Ltd.) set to a temperature of 37° C. and a humidity of 50%. A total weight (V3) was measured every 5 hours of exposure time. From this result, a reduction ratio of the insect repellent component (after 5 hours) was calculated by the following equation.

$$\text{Reduction rate (\%)} = (V2-V3)/(V1 \times (P1/(1+P1)) \times D1) \times 100$$

Assuming that the contained ratio of the insect repellent component is P1 (ml/g), and a specific gravity of the contained insect repellent component is D1 (g/ml), the reduction rate (%) is represented by the following equation.

The total weight was likewise measured after the exposure time of 10 hours. From this result, the reduction ratio of the insect repellent component (after 10 hours) was calculated.

(10) Feeling of Use of Pest Repellent Material

A sensory test is conducted by 20 expert panelists on the pest repellent material (i). Then, a hearing survey is conducted on the smooth feeling during application to the skin. The results are evaluated based on the following evaluation criteria.

Evaluation Criteria

A: Very good

B: Good

C: Fair

D: Poor

E: Very poor

Example 2

Sample 2 was prepared in the same manner as in Example 1, except that the porous particles having an average size of 12 μm, a pore volume of 3.4 ml/g, and a pore diameter of 100 nm were used instead of the porous particles used in Example 1. Then, it was measured in the same manner as in Example 1.

Example 3

Sample 3 was prepared in the same manner as in Example 1, except that the porous particles having an average size of 12 μm, a pore volume of 2.9 ml/g, and a pore diameter of 400 nm were used instead of the porous particles used in Example 1. Then, it was measured in the same manner as in Example 1.

Example 4

Sample 4 was prepared in the same manner as in Example 1, except that the porous particles having an average size of 5 μm, a pore volume of 2.9 ml/g, and a pore diameter of 100 nm were used instead of the porous particles used in Example 1. Then, it was measured in the same manner as in Example 1.

Comparative Example 1

The same porous particles as in Example 1 (SMBSP-1 produced by JGC Catalysts and Chemicals Ltd.: average particle size 12 μm, pore volume 2.9 ml/g, pore diameter 100 nm, oil absorption amount 370 ml/g) were prepared. To 1.0 kg of the porous particles (A), 2.8 liters of DEET (manufactured by Tokyo Chemical Industry Co., Ltd.) was added. Then, it was mixed at room temperature for 5 hours using the rotary evaporator. Thus, a pest repellent material (A) is obtained. The porous particles and the pest repellent material were evaluated as Sample A in the same manner as in Example 1.

Comparative Example 2

Sample B was prepared in the same manner as in Comparative Example 1, except that SMB P-1500 (average particle size 10 μm, pore volume 0.3 ml/g, pore diameter 7 nm) produced by JGC Catalysts and Chemicals Ltd. was used instead of the porous particles used in Comparative Example 1. Then, it was measured in the same manner as in Example 1.

Comparative Example 3

Sample C was prepared in the same manner as in Comparative Example 1, except that the porous particles having an average size of 12 μm, a pore volume of 2.2 ml/g, and a pore diameter of 800 nm was used instead of the porous particles used in Comparative Example 1. Then, it was measured in the same manner as in Example 1.

TABLE 1

| Item | Unit | Porous silica-based particles | | | | | | |
|---|---|---|---|---|---|---|---|---|
| | | Sample 1 | Sample 2 | Sample 3 | Sample 4 | Sample A | Sample B | Sample C |
| Absorbance ratio ($I_1/I_2$) | — | 0.001 | 0.001 | 0.001 | 0.001 | 0.015 | 0.07 | 0.011 |
| Contact angle (with water) | ° | 100 | 100 | 100 | 100 | 45 | 45 | 45 |
| Contact angle (with insect repellent component) | ° | 45 | 45 | 45 | 45 | 45 | 45 | 45 |
| Pore volume | ml/g | 2.9 | 3.4 | 2.9 | 2.9 | 2.9 | 0.3 | 2.2 |
| Average pore diameter | nm | 100 | 100 | 400 | 100 | 100 | 7 | 800 |
| Average particle size | μm | 12 | 12 | 12 | 5 | 12 | 11 | 12 |
| Compressive fracture strength | kPa | 10 | 3 | 6 | 15 | 10 | 880 | 7 |
| Average particle size after collapse | μm | 0.5 | 0.2 | 0.4 | 0.5 | 0.4 | 11 | 0.05 |

TABLE 2

| Item | Unit | Pest repellent material | | | | | | |
|---|---|---|---|---|---|---|---|---|
| | | Sample 1 | Sample 2 | Sample 3 | Sample 4 | Sample A | Sample B | Sample C |
| Contained amount of insect repellent component | ml/g | 2.8 | 3.3 | 2.8 | 2.8 | 2.8 | 0.3 | 2.1 |
| Reduction ratio of insect repellent component (after 5 hours) | % | 11 | 11 | 25 | 16 | 3 | 1 | 4 |
| Reduction ratio of insect repellent component (after 10 hours) | % | 20 | 20 | 50 | 35 | 4 | 1 | 6 |
| Feeling (smooth feeling) | — | A | A | B | C | D | A | B |

The invention claimed is:

1. A pest repellent material comprising: porous particles including primary particles forming pores and aggregating; and an insect repellent component present in the pores, wherein
   the primary particles contain silica as a component,
   a contact angle of the porous particles with water is greater than 90°, and a contact angle of the porous particles with the insect repellent component is 1° to 90°,
   a pore volume (PV) of the porous particles is 2.0 to 5.0 ml/g,
   an average particle size of the porous particles is 2 to 20 μm,
   an average pore diameter (PD) of the porous particles is 0.01 to 0.5 μm,
   in an infrared absorption spectrum of the pest repellent material, a ratio ($I_1/I_2$) of the maximum absorbance ($I_1$) at 3730 to 3750 cm$^{-1}$ to the maximum absorbance ($I_2$) at 1160 to 1260 cm$^{-1}$ is 0.005 or less, and
   the compressive strength of the porous particles is 0.1 to 100 KPa, and after collapse an average particle size is 0.05 to 1.0 μm.

2. The pest repellent material according to claim 1, wherein an opening ratio of the pores on a surface of the porous particles is 20 to 75%.

3. The pest repellent material according to claim 1, wherein
   a ratio (PD/VP) of the average pore diameter PD (μm) to a vapor pressure VP (Pa) at 20° C. of the insect repellent component is 10 or less.

4. The pest repellent material according to claim 1, wherein
   2 to 5 ml of the insect repellent component is included based on 1 gram of the porous particles.

* * * * *